(12) United States Patent
Brouwer et al.

(10) Patent No.: US 7,628,499 B2
(45) Date of Patent: Dec. 8, 2009

(54) WING MIRROR UNIT

(75) Inventors: Stefan Frits Brouwer, Schoonhoven (NL); Paulus Gerardus Maria Van Stiphout, Woerden (NL)

(73) Assignee: MCi (Mirror Controls International) Netherlands B.V., Montfoort (NL)

( * ) Notice: Subject to any disclaimer, the term of this patent is extended or adjusted under 35 U.S.C. 154(b) by 0 days.

(21) Appl. No.: 10/553,134

(22) PCT Filed: Apr. 15, 2004

(86) PCT No.: PCT/NL2004/000255

§ 371 (c)(1),
(2), (4) Date: Aug. 2, 2006

(87) PCT Pub. No.: WO2004/091974

PCT Pub. Date: Oct. 28, 2004

(65) Prior Publication Data

US 2006/0274442 A1 Dec. 7, 2006

(30) Foreign Application Priority Data

Apr. 18, 2003 (NL) .................................. 1023227

(51) Int. Cl.
*G02B 7/182* (2006.01)
(52) U.S. Cl. .................................... 359/877
(58) Field of Classification Search ................ 359/841, 359/871–878, 881
See application file for complete search history.

(56) References Cited

U.S. PATENT DOCUMENTS

| | | | |
|---|---|---|---|
| 4,712,891 A | 12/1987 | Midorikawa et al. | |
| 4,915,485 A * | 4/1990 | Ogasawara | 359/841 |
| 5,557,476 A | 9/1996 | Oishi | |
| 5,949,591 A * | 9/1999 | Whitehead | 359/872 |
| 5,966,254 A * | 10/1999 | Flowers et al. | 359/841 |
| 6,022,113 A * | 2/2000 | Stolpe et al. | 359/872 |
| 6,139,159 A * | 10/2000 | Whitehead | 359/841 |
| 6,213,609 B1 * | 4/2001 | Foote et al. | 359/841 |
| 6,239,928 B1 * | 5/2001 | Whitehead et al. | 359/871 |
| 6,394,616 B1 | 5/2002 | Foote et al. | |

FOREIGN PATENT DOCUMENTS

| | | |
|---|---|---|
| EA | 1129906 | 9/2001 |
| EP | 0931699 | 7/1999 |

* cited by examiner

*Primary Examiner*—Euncha P Cherry
(74) *Attorney, Agent, or Firm*—Dykema Gossett PLLC

(57) ABSTRACT

A wing mirror unit for a motor vehicle comprising a mirror foot and a mirror housing connected to the mirror foot. The mirror housing is adjustable between a folded orientation and an unfolded orientation. The wing mirror unit further includes an actuator arranged to move adjacent surfaces of the mirror housing and the mirror foot transversely with respect to each other between a first position, in which the adjacent surfaces of the mirror housing and the mirror foot form a slit, and a second position, in which the adjacent surfaces abut each other.

22 Claims, 2 Drawing Sheets

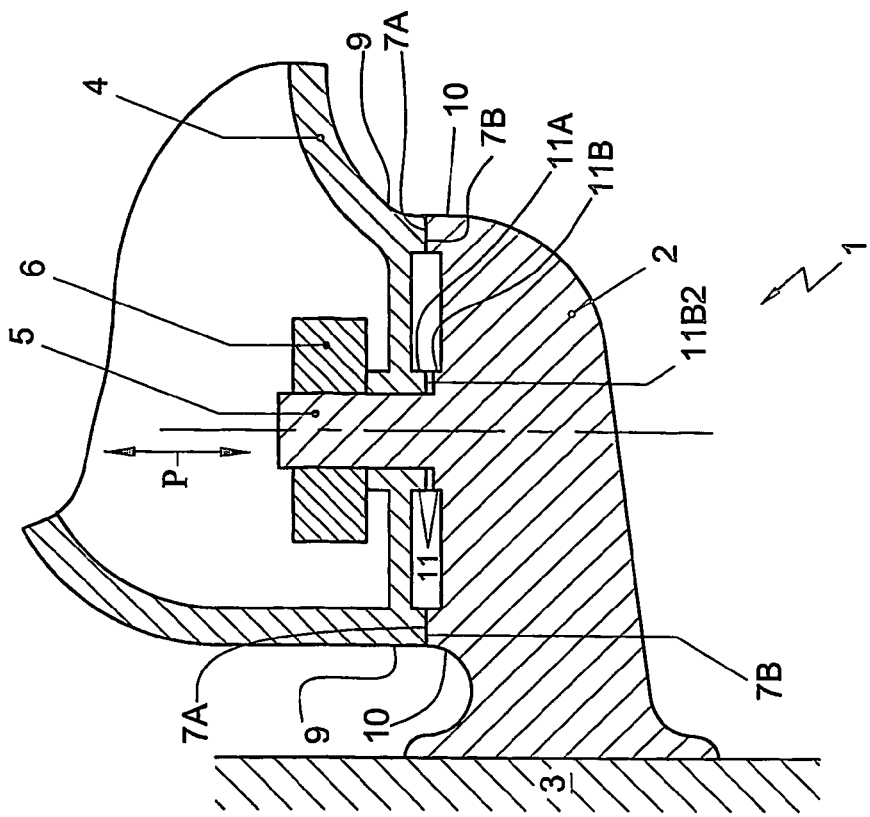
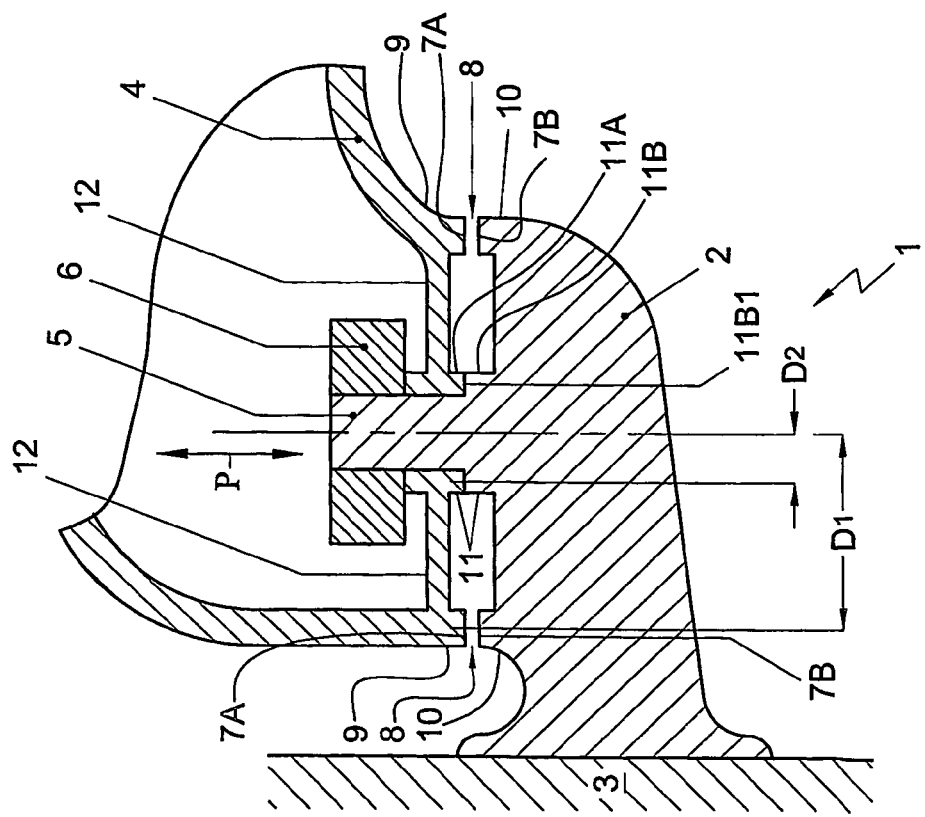

WING MIRROR UNIT

BACKGROUND AND SUMMARY

The invention relates to a wing mirror unit, in particular for a motor vehicle, comprising a mirror foot for attachment to the body of a motor vehicle, and a mirror housing connected with the mirror foot, which mirror housing is adjustable with respect to the mirror foot between a folded orientation, in which the mirror housing substantially extends along the body of the motor vehicle, and an unfolded orientation, in which the mirror housing is substantially oriented transversely to the body.

Such a wing mirror unit is commonly known. The adjustability serves to adjust the mirror housing of the wing mirror between the unfolded orientation, in which the mirror housing extends relatively far outward with respect to the body, and a folded orientation, in which the mirror housing projects less far. In this manner, inter aha the risk of damage to the wing mirror can be diminished when parking, and the wing mirror can yield somewhat when colliding with an object. The wing mirror unit often comprises an electric actuator, with which the mirror housing is adjustable between the folded orientation and the unfolded orientation.

In the known wing mirror unit, to keep the necessary electric power of the electric actuator for adjusting the mirror housing as small as possible, the contact between the mirror housing and the mirror foot is kept as small as possible. Consequently, a slit is present between the adjacent surfaces of the mirror housing and the mirror foot. The mirror housing and the mirror foot are often provided with ring-shaped contact surfaces, for instance ring-shaped or cone-shaped contact surfaces, which are located coaxially around a base pivot, around which the mirror housing, under the action of the actuator, is pivotally arranged with respect to the mirror foot. Around the contact surfaces, between the mirror housing and the mirror foot, then extends a slit, which is often ring- or cone-shaped.

It is a drawback of this structure that through the presence of the slit the outer contours of the mirror foot and the mirror housing connect discontinuously. Through this discontinuity, during driving with the vehicle, a substantial amount of wind noise can be produced, which is unpleasant to the driver and the passengers of the motor vehicle.

The invention has for its object to provide a wing mirror unit of the type mentioned in the opening paragraph, in which, while retaining the advantages, the above drawback can be avoided. To this end, the wing mirror unit according to the invention is characterized in that the wing mirror unit is provided with an actuator, which is arranged to move adjacent surfaces of the mirror housing and the mirror foot transversely to each other between a first position, in which the adjacent surfaces of the mirror housing and the mirror foot enclose a slit, and a second position, in which the adjacent surfaces abut each other and the outer contours of the mirror foot and the mirror housing substantially connect flowingly. By arranging the actuator to move the adjacent surfaces of the mirror housing and the mirror foot transversely to each other, the slit can be closed and then be opened again without high friction occurring as a result of tangential movements of the contact surfaces along each other during the pivoting of the mirror housing. Consequently, a relatively light motor will suffice for the actuator, even when at the location of the outer contours of the mirror foot and the mirror housing the adjacent surfaces are located relatively far from a central axis of rotation energized by the actuator.

Preferably, the actuator is arranged to adjust the wing mirror unit in or near the unfolded orientation between the first position and the second position, so that during adjustment between the folded and the unfolded orientation the wing mirror unit is substantially in the first position. This ensures that during adjustment a slit is present and the contact surface between adjacent surfaces of the mirror housing and the mirror foot are minimized, so that when folding and unfolding a lowest possible friction must be overcome.

Further advantageous embodiments of the invention are defined in the subclaims.

BRIEF DESCRIPTION OF THE DRAWINGS

The invention will be explained in more detail on the basis of a number of exemplary embodiments, which are shown in a drawing. In the drawing:

FIG. 1 shows a diagrammatic cross-section of a first embodiment of a wing mirror unit according to the invention near the unfolded orientation in the first position;

FIG. 2 shows the wing mirror unit of FIG. 1 in the unfolded orientation and in the second position;

DETAILED DESCRIPTION

Figure 3:
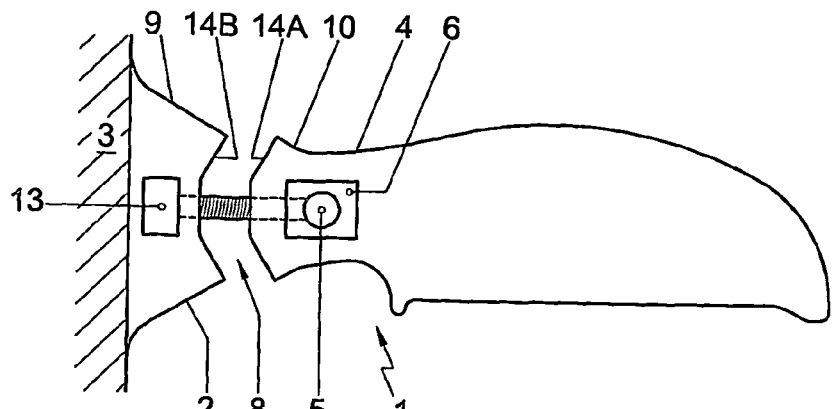
FIG. 3 shows a diagrammatic top view of a second embodiment of a wing mirror unit according to the invention in the unfolded orientation in the first position.

The figures only relate to diagrammatic representations of preferred embodiments of the invention and are given by way of non-limiting exemplary embodiment. In the figures, similar or corresponding parts are denoted by the same reference numerals.

FIG. 1 shows a wing mirror unit 1, comprising a mirror foot 2, which is attached to the body 3 of a motor vehicle. The wing mirror unit 1 further comprises a mirror housing 4 connected with the mirror foot 2. In this exemplary embodiment, the connection is realized in that the mirror foot 2 comprises a base pivot 5, around which the mirror housing 4, under the action of a hinge actuator 6, is pivotally arranged with respect to the mirror foot 2. With the aid of the actuator 6, the mirror housing 4 is adjustable between a folded orientation, in which the mirror housing 4 substantially abuts along the body 3 of the motor vehicle, and the unfolded orientation shown in FIG. 1, in which the mirror housing 4 is substantially oriented transversely to the body.

The actuator 6 is arranged to move adjacent surfaces 7a, 7b of respectively the mirror housing 4 and the mirror foot 2 in a direction, indicated by an arrow P, transversely to each other between the first position shown in FIG. 1, in which the adjacent surfaces 7a, 7b of the mirror housing 4 and the mirror foot 2 enclose a slit 8, and a second position shown in FIG. 2, in which the adjacent surfaces 7a, 7b abut each other. In the first position shown in FIG. 1, the outer contours 9, 10 of respectively the mirror foot 2 and the mirror housing 4 connect discontinuously. In the second position shown in FIG. 2, the outer contours 9, 10 of respectively the mirror foot 2 and mirror housing 4 substantially connect flowingly. In the position shown in FIG. 2, the slit 8 is substantially closed, so that during driving with the motor vehicle this slit produces considerably less wind noise.

The hinge actuator 6 is arranged to adjust the wing mirror unit 1 near the unfolded orientation between the first position and the second position. During adjustment between the folded and the unfolded orientation, the wing mirror unit 1 is then substantially in the first position.

In this exemplary embodiment, this is realized in that the adjacent surfaces 7a, 7b of respectively the mirror housing 4 and the mirror foot 2 are designed as flat, ring-shaped contact surfaces, which are located coaxially around the base pivot 5 at a first distance D1, while the mirror foot 2 and the mirror housing 4 cooperate via three cam path assemblies 11 curvedly extending around the base pivot 5 at a second distance D2. The cam path assemblies 11 each comprise a cam 11a provided on the mirror housing 4, here integrated with a flange 12, which engages the cam path 11b provided on the mirror foot 2. The cam path 11b is provided with a flat path part 11b1, which during folding and unfolding guarantees the slit 8 between the contact surfaces 7a, 7b, which slit corresponds with the first position, and with a run-on surface 11b2, which in or near the unfolded orientation guarantees the adjustment between the first and the second position of the contact surfaces 7a, 7b.

When folding from the unfolded orientation, the cams 11a will cooperate with the run-on surfaces 11b2, so that the adjacent contact surfaces 7a, 7b move apart transversely to each other from the second position, in which they abut against each other, to the first position, in which they enclose the slit 8. In this exemplary embodiment, the movement of the contact surfaces 7a, 7b transverse to each other corresponds with a movement in the axial direction along the base pivot 5. As soon as the slit has opened completely, the cams 11a cooperate with the flat parts 11b1 of the cam paths. Directly from the moment that the slit 8 begins to open up to the moment that the folded orientation is reached, the actuator only needs to overcome the frictional moment exerted by the frictional forces between the cams 11a and the cam paths 11b. Through the relatively small distance D2, the frictional moment to be overcome is substantially smaller than when the contact surfaces 7a, 7b would remain in contact during the adjustment. Furthermore, the contact surface is smaller.

Figure 4:
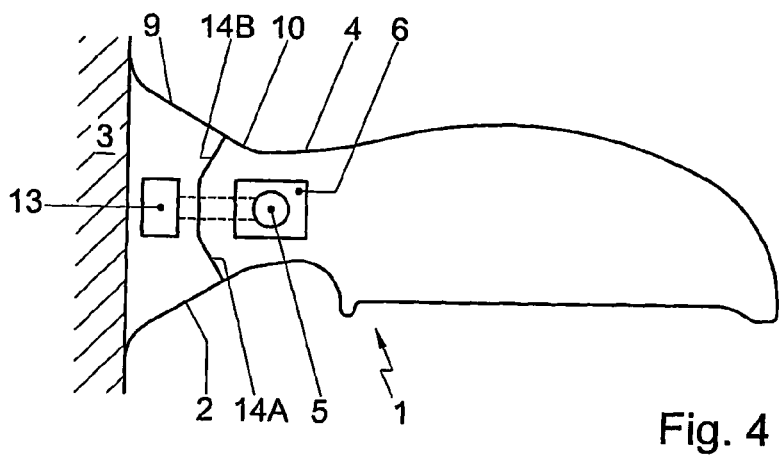
FIG. 4 shows the wing mirror unit of FIG. 3 in the unfolded orientation and in the second position.
Figure 5:
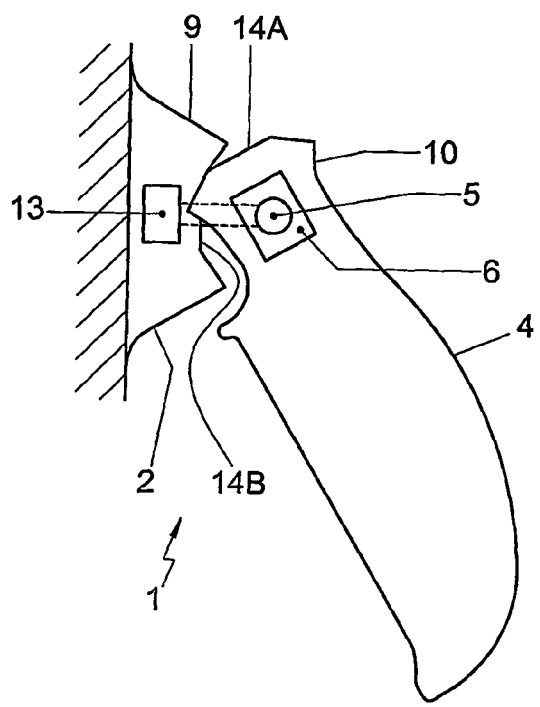
FIG. 5 shows the wing mirror unit of FIG. 3 in the folded orientation and in the second position.

Referring to FIGS. 3 through 5, a second embodiment of a wing mirror unit according to the invention is shown therein. In this embodiment, the mirror foot 2 and the mirror housing 4, under the action of a linear actuator 13, are translatably arranged with respect to each other. In this embodiment, the adjacent contact surfaces of the mirror housing 4 and the mirror foot 2 comprise contact surfaces 14a, 14b, which, through translation in transverse direction with respect to the body 3, are adjustable under the influence of the linear actuator 13 between the first position, in which they enclose a slit 8, and the second position, in which the contact surfaces abut each other in a form-closed manner. When within the context of this application reference is made to adjustment transverse to the body, this is understood to mean that the adjusting direction comprises a component in the direction transverse to the body. The adjusting direction may also comprise components in other directions, such as, for instance, in a direction substantially parallel to the body and directed backward. In another embodiment, the adjusting direction may, for instance, be directed diagonally backward.

The mirror housing 4 is pivotally arranged around a base pivot 5. In this embodiment, to ensure that in folded orientation the mirror housing 4 can substantially abut along the body of the motor vehicle, the mirror housing 4, when folding, preferably just before pivoting from the unfolded orientation to the folded orientation takes place, is moved outward with respect to the body, under the influence of the linear actuator 13, so that the slit 8 is formed, and the form closure is undone. In the unfolded orientation, for instance when the mirror housing 4 comes into contact with an object, the mirror housing 4 can pivot around the base pivot 5 under elastic deformation of the form-closed contact surface 14b of the mirror foot. In this manner, an emergency folding orientation can be reached, which is shown in FIG. 5. When the mirror housing 4 is then manually pivoted back around the base pivot 5, the anchoring of the pivoting axis 14 will be effected again through relaxation of the elastically deformed material at the location of the contact surface 14b. It may be clear that such a manner of form-closed anchoring of the mirror housing to the mirror foot can per se also be advantageous in a wing mirror unit of the type mentioned in the opening paragraph, in which the contact surfaces cooperating in a form-closed manner permanently abut each other, i.e. when during adjustment of the mirror housing no slit is present between the contact surfaces cooperating in a form-closed manner.

It may be clear that the invention is not limited to the exemplary embodiments described herein. Thus, the wing mirror unit may be adjusted by pivoting with respect to the body between the first and the second position to close the slit, and the closure of the slit and the pivoting of the mirror housing may be carried out not only successively, but also at least partly simultaneously, optionally under the action of the same actuator. When the wing mirror unit is equipped with a single actuator, which drives both adjustment between the first and the second position and pivoting between the folded orientation and the unfolded orientation, the actuator may be included in the mirror foot.

Such variants will be clear to those skilled in the art and are deemed to be within the scope of the invention as defined in the appended claims.

What is claimed is:

1. A wing mirror unit for a motor vehicle comprising:
    a mirror foot;
    a mirror housing connected to the mirror foot; and
    an actuator;
    wherein the mirror housing is adjustable with respect to the mirror foot between a folded orientation, in which the mirror housing substantially extends along said motor vehicle, and an unfolded orientation, in which the mirror housing is substantially oriented transversely to said motor vehicle; a pivot for the folded and unfolded orientations is provided outside the mirror foot and within the mirror housing; the actuator is configured to move adjacent surfaces of the mirror housing and the mirror foot transversely with respect to each other; and further wherein the pivot is movable and configured to translate in a transverse direction toward and away from the mirror foot.

2. The wing mirror unit according to claim 1, wherein the actuator is configured to adjust the wing mirror unit in or near the unfolded orientation between the first position and the second position, such that during adjustment between the folded orientation and the unfolded orientation the wing mirror unit is substantially in the first position.

3. The wing mirror unit according to claim 1, wherein the mirror foot comprises a base pivot, around which the mirror housing, under action of the actuator, is pivotally arranged with respect to the mirror foot.

4. The wing mirror unit according to claim 3, wherein the adjacent surfaces of the mirror housing and the mirror foot form contact surfaces; the contact surfaces are located around the base pivot at a first distance; and the mirror foot and the mirror housing cooperate via at least one cam path assembly curvedly extending around the base pivot at a second, smaller distance.

5. The wing mirror unit according to claim 4, wherein the at least one cam path assembly comprises a cam provided on one of the mirror housing or the mirror foot, the cam engaging a cam path provided on the other.

6. The wing mirror unit according to claim 5, wherein the cam path includes a flat path part that, during folding and unfolding of the mirror housing with respect to the mirror foot, provides the slit between the contact surfaces.

7. The wing mirror unit according to claim 6, wherein a run-on surface in or about the unfolded orientation allows the contact surfaces to adjust between the first and the second position.

8. The wing mirror unit according to claim 1, wherein the actuator is a linear actuator.

9. The wing mirror unit according to claim 8, wherein the adjacent surfaces of the mirror housing and the mirror foot form contact surfaces; and at least one of the contact surfaces is comprised of an elastic material.

10. The wing mirror unit according to claim 8, wherein the mirror foot and the mirror housing are translatably arranged with respect to each other, and the adjacent surfaces of the mirror housing and the mirror foot, in the second position, cooperate in a form-closed manner and, through translation in transverse direction with respect to said motor vehicle, are adjustable between the first position and the second position.

11. The wing mirror unit according to claim 1, wherein the adjacent surfaces of the mirror housing and the mirror foot form contact surfaces; and at least one of a contact surfaces is comprised of an elastic material.

12. The wing mirror unit according to claim 11, wherein when the at least one contact surface is elastically deformed, the mirror housing can pivot with respect to the mirror foot.

13. A mirror unit for comprising:
a mirror foot;
a mirror housing connected to the mirror foot; and
an actuator pivotally connected to the mirror foot,
wherein a pivot for folding and unfolding the mirror housing relative to the mirror foot is provided outside the mirror foot and within the mirror housing; and the actuator is configured to move adjacent surfaces of the mirror housing and the mirror foot transversely with respect to each other between a first position, in which the adjacent surfaces of the mirror housing and the mirror foot form a slit, and a second position, in which the adjacent surfaces abut each other; and further wherein the pivot is movable and configured to translate in a transverse direction toward and away from the mirror foot.

14. The mirror unit according to claim 13, wherein the mirror housing substantially extends along a motor vehicle in a folded orientation and the mirror housing is substantially oriented transversely to said motor vehicle in an unfolded orientation.

15. The mirror unit according to claim 13, wherein the actuator is configured to adjust the mirror unit in the unfolded orientation between the first position and the second position, such that during adjustment between the folded and the unfolded orientation the mirror unit is substantially in the first position.

16. The mirror unit according to claim 13, wherein the mirror foot includes a base pivot that pivotally engages the mirror housing.

17. The mirror unit according to claim 16, wherein the adjacent surfaces of the mirror housing and the mirror foot each form contact surfaces around the base pivot at a first distance, and wherein the mirror foot and the mirror housing cooperate via at least one cam path assembly curvedly extending around the base pivot at a second, smaller distance.

18. The mirror unit according to claim 17, wherein the at least one cam path assembly comprises a cam on one of the mirror housing or the mirror foot and a cam path provided on the other for engaging the cam, wherein the cam path includes a flat path part that forms the slit between the contact surfaces.

19. The mirror unit according to claim 18, wherein the flat path part allows the contact surfaces to adjust between the first and the second position.

20. The mirror unit according to claim 13, wherein said actuator is a linear actuator that adjusts the mirror foot and the mirror housing between the first position and the second position in a transverse direction with respect to a motor vehicle.

21. The mirror unit according to claim 20, wherein at least a portion of one of the contact surfaces of the mirror foot or the mirror housing is comprised of an elastically deformable material.

22. The mirror unit according to claim 1, wherein the pivot for the folded and unfolded orientations is provided within the mirror housing.

* * * * *